United States Patent [19]

Schleese et al.

[11] Patent Number: 4,482,412

[45] Date of Patent: Nov. 13, 1984

[54] METHOD OF MAKING A COAXIAL CABLE

[75] Inventors: Eckhardt Schleese, Stadthagen; Rudolf Gessner, Wedemark; Horst Manke, Nienstädt-Sülbeck, all of Fed. Rep. of Germany

[73] Assignee: Kabel-und Metalwerke Gutehoffnungshuette AG, Hanover, Fed. Rep. of Germany

[21] Appl. No.: 56,433

[22] Filed: Jul. 10, 1979

[30] Foreign Application Priority Data

Jun. 22, 1978 [DE] Fed. Rep. of Germany ....... 2827337

[51] Int. Cl.[3] ...................... B32B 27/00; H01B 11/00; H01B 13/06

[52] U.S. Cl. ........................................ 156/51; 156/55; 156/56; 174/113 C; 174/118; 174/120 SR; 428/383

[58] Field of Search ........................ 156/47, 50, 51, 54, 156/53, 55, 56; 174/118, 116, 120 SR, 113 C, 110 RM; 264/174, 299; 428/379, 383

[56] References Cited

U.S. PATENT DOCUMENTS

| | | | |
|---|---|---|---|
| 2,427,507 | 9/1947 | Powell et al. | 156/55 |
| 3,144,369 | 8/1964 | Foord et al. | 156/51 |
| 3,229,012 | 1/1966 | Garner | 264/174 |
| 3,332,814 | 7/1967 | Yoshimura et al. | 156/56 X |
| 3,485,939 | 12/1969 | Brown et al. | 156/51 X |
| 3,685,147 | 8/1972 | Nevin | 156/51 X |
| 3,710,440 | 1/1973 | Nevin | 156/47 X |
| 4,033,800 | 7/1977 | Ollis | 264/174 X |
| 4,181,486 | 1/1980 | Saito | 264/174 X |

*Primary Examiner*—Lorraine T. Kendell
*Attorney, Agent, or Firm*—Ralf H. Siegemund

[57] ABSTRACT

The insulating spacer for an h-f cable is extruded on the inner conductor, at approximately the correct dimensions, followed by a sizing step in which insulation powder is deposited on the horizontally running, insulated conductor core and melted in a funnel-shaped die to obtain a coating or film which establishes the final dimensions. The outer conductor is formed on top of that coating.

4 Claims, 4 Drawing Figures

METHOD OF MAKING A COAXIAL CABLE

BACKGROUND OF THE INVENTION

The present invention relates to a high-frequency cable of the coaxial variety, including an inner conductor, an outer conductor in concentric relation to the inner conductor, and an insulation in between.

Coaxial high-frequency cables are well known in the art. They are used, for example, for feeding a signal from a transmitter circuit to an antenna. More recently, these cables have been used increasingly in cable TV networks. Economic mass production is, therefore, of great interest to the industry.

The insulation between the inner conductor and the outer conductor does not only insulate and separate the conductors from each other, but at least a part of the insulation must serve as support for holding the inner conductor concentrically in the interior of the outer conductor, or the outer conductor must be held by the insulation, or a portion thereof, on the inner conductor.

The spacing and supporting function in such a cable is, for example, provided by means of spacer disks or by a helical element. These structures can, indeed, be made at a sufficiently high degree of accuracy so that, once the spacer or spacers have been placed on the inner conductor, the outer conductor, in turn, can be placed thereon and will assume the correct concentric position without requiring prior reworking of the spacer elements.

Another approach is to extrude a solid or foaming insulation upon the inner conductor. However, accuracy in the resulting dimensions, as far as concentricity is concerned, is not always adequate nor sufficient to provide a cable which does not exhibit reflection. Thus, such an insulation requires reworking of its surface contour to establish the desired and required concentricity of the outer surface which will support the outer conductor. It can readily be seen that such a reworking and surface finishing of the insulation surface requires cutting, i.e., removal of material. This means one has to make the insulation thicker than ultimately necessary so that one has material available for peeling, cutting, or other types of removal, to arrive at the desired diameter and circularity.

Obviously, this procedure results in the production of considerable losses and insulation scrap whose reusability is quite limited if at all possible. Moreover, gauging the insulation by such a cutting or peeling step slows production speed, and pulling the conductor through the production line and through this particular working station requires considerable force.

The British Pat. No. 767,336 discloses a method in which the insulation is, so to speak, thermally peeled. The insulated inner conductor is drawn through a heated conical die which melts the outer surface of the insulation being stripped off as excess to obtain the desired dimensions. Again, one produces a considerable amount of waste in this manner. A conical die is also used in the method as disclosed in U.S. Pat. No. 4,183,888, filed Aug. 20, 1973, but for an entirely different purpose.

DESCRIPTION OF THE INVENTION

It is an object of the present invention to improve the accuracy of the dimensions of an insulation spacer for and in a coaxial cable.

It is another object of the present invention to use and to provide insulation as between an inner conductor and an outer conductor, other than individual spacer disks or a helical element, achieving comparable accuracy without incurring the waste inherent in the methods as outlined above and without compromising production speed.

It is, therefore, a specific object of the present invention to provide a new and improved method of making a coaxial cable in which a core is made first, being comprised of an inner conductor and insulation thereon, followed by providing the outer conductor on top of that core.

In accordance with the preferred embodiment of the present invention, it is suggested to provide a coaxial cable as follows. Insulation is extruded onto an inner conductor, but at a diameter not larger than, preferably being less than the desired and required diameter for a coaxial cable to be made. In other words, on the average the radial dimensions of that insulation should be close to, but not exceeding, the final radial dimensions as far as the spacing between inner and outer conductor is concerned. Next, powder of an insulating composition is poured onto the horizontally running insulation and melted in a heated funnel-shaped die with narrow opening so that the powder is melted, adheres to and intimately combines with the insulator and becomes a gauged surface layer or film, determining the final diameter of this insulation composite by operation of the die. The layer provided on the extruded insulation not only gauges the dimensions of the, thus, produced spacer, but evens out any unevenness so that the extrusion, in turn, does not have to be carried out at a high degree of accuracy. No peeling or cutting is involved so that the withdrawal and moving forces for the core assembly are low, and production speed is as high as the extrusion permits. Subsequently, the outer conductor is provided, e.g., formed, folded, or extruded arount the gauged core.

It can, thus, be seen that the inventive method does not operate by stripping off excess insulation, but, basically, by adding on insulative material to arrive at the final dimensions. The add-on is provided by the powder which is deposited to the extend needed to even out the surface and to supplement the radial dimensions of the conductor-plus-extruded insulation core, wherever needed. Since the molten powder forms a bead in the narrow part of the die, this layer is a coherent one, i.e., it covers the core everywhere, possibly by a very thin film in some instances and some locations. This supplemental layer may vary in thickness, depending upon the unevenness of the surface of the extruded insulation of the core, but it covers the core completely and has a uniform outer diameter. Even if the core insulation is locally a little too thick, it is also softened to some extend in the die and shifted into regions of lesser dimension. At no point is any stripping or peeling involved.

It was found that the resulting cable has, indeed, very accurate dimensions and produces reflections only at very low levels. Also, if the supplemental layer is made from an adhesive for bonding the outer conductor to the core, one obtains a sealed configuration in the sense that migration of moisture inside the outer conductor in longitudinal direction is impeded.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

Figure 1:
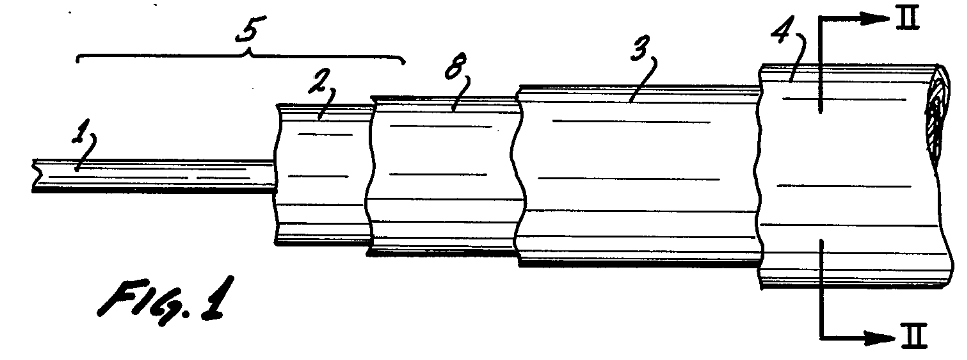
FIG. 1 is a side view of a coaxial cable, showing parts of the several layers cut away and having been made in accordance with the preferred embodiment.
Figure 2:
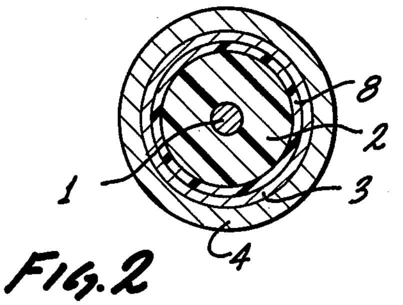
FIG. 2 is a section view taken in the plane identified by II—II in FIG. 1.
Figure 4:
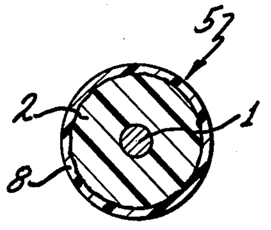
FIG. 4 is a section view, on an enlarged scale, taken in the plane identified by IV—IV in FIG. 3.

Proceeding now to the detailed description of the drawings, the figures show an inner conductor 1 of and for a coaxial, high-frequency cable. This conductor 1 is either a wire, a bundle of stranded filaments, or a tube made of copper or of any other suitable electrically conductive material. The conductor carries a thick insulation layer 2, being either solid or a foam. Polyethylene is the preferred insulating material for this purpose.

Layer 2 carries an outer skin or film 8 made of the same or a compatible insulation material, the skin being bonded (fused) to the insulation body 2. Reference numeral 3 denotes the outer conductor for this particular coaxial cable. This conductor 3 is a copper tube or an aluminum tube. A protective coating 4 made of a conventional wear-resisting and also insulating material is placed around the outer conductor 3.

Reference numeral 5 defines a core which consists of the inner conductor and the insulation thereon. This core is made in accordance with the preferred embodiment and upon completion, it is covered by the outer conductor 3 and the jacket 4.

Figure 3:
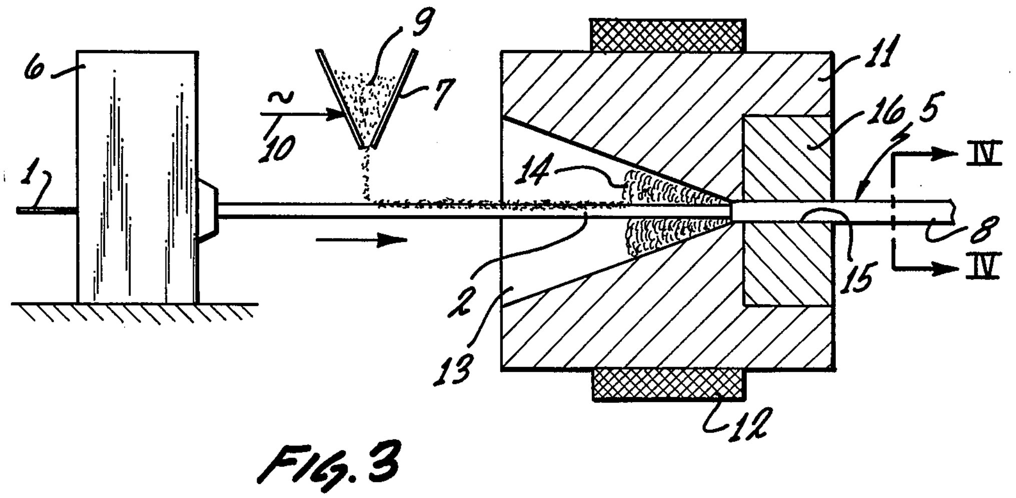
FIG. 3 is a side view of equipment for practicing ihe invention.

Turning now to the process in detail (FIG. 3), an inner conductor 1 of the variety outlined above is fed to an extruder 6 which provides thereon a coating 2 at a thickness not exceeding, on the average, the desired diameter of the insulative spacer needed in the particular cable to be made. The diameter of the core 5 produced by extrusion thus far should be rather close to the diameter of the insulation as a whole in the coaxial cable to be made. It may locally exceed that diameter, but the average should not exceed that desired diameter. Thus, for reasons of tolerances, the diameter may well be on the small side because the requirement of cutting or stripping any excess off should be avoided. Local areas having too large a diameter will and can be dealt with differently, i.e., without cutting, or peeling, or melt-off.

The coated conductor leaves the extruder on a horizontal path, in the direction of the arrow. Powder 9 of insulative material is deposited on top of jacket 12 by means of a vibrating conveyor 7. Powder 9 in the conveyor leaves through a narrow opening in the bottom thereof, and is, more or less, thinly heaped on the still warm insulation. Some of the powder that may tend to fall off is caught by the warm surface of the insulation jacket 2.

Reference numeral 10 refers schematically to vibrating agitation of the conveyor. The vibration is controlled, e.g., as to intensity and/or frequency, for metering the rate of flow of the powder. It may be advisable to heat the powder a little but not sufficient to render it tacky and lumpy.

The core including and carrying now powder thereon is passed to a drawing die 11 which is heated as is indicated by a coil 12. The die 11 has a rather large funnel-shaped chamber 13 whose wide open end faces the oncoming core and narrows in downstream direction. The die proper is comprised of an insert 16 with a sizing opening 15 for defining the desired and required spacing as between the inner conductor and the outer conductor later to be placed on top. This die member 16 establishes particularly the dimensions and the distribution of layer 8 made from molten powder.

The powder, as it arrives in chamber 13, melts and accumulates in a bead 14 near the narrow end of the funnel. Core 5 passes through that bead and is provided thereby with a thin sizing layer, film, or coating 8 which, for example, fills any pits, dents, or the like, which the core may have. This includes filling and cladding all portions of the surface of the core which are, in fact, undersized. Everywhere, a thin film of layer 8 is positively established as even those portions of the core having already the final radial dimensions will be slightly redistributed on account of their being softened by the die heating and/or by their still not having cooled from the extrusion.

This procedure includes even dealing with instances of local oversized dimensions of the core insulation 2. The insulation core 2 softens at the surface by the heat in the chamber and is readily distributed because the average diameter of that insulation must not exceed the final desired diameter. As a consequence, a fully coherent film or layer is produced. The bead 14 of melted powder serves as a supply source for this film. The depositing of powder may be slowed or even interrupted when the bead becomes too big. Thus, one will avoid producing any waste by metering the add-on material. Nothing is cut off, or peeled, or thermally stripped, particularly as far as the bulk of the insulation, 2, is concerned.

After the insulation coating has been provided on the core, the outer conductor is formed thereon. For example, a copper or an aluminum strip is longitudinally folded around core 5 (now carrying layer 8) to provide a split tube. Adjoining edges of the folded strip are welded with a longitudinally extending seam and the closed tube is then drawn onto the insulation. In this case, it is advisable to make layer 8 from a bonding agent and adhesive. Aside from enhenced bonding to core 2, such an adhesive will also bond the outer conductor, now made, to core 2. Furthermore, one seals the interior of the outer conductor particularly against migration of water in axial direction, underneath the outer conductors inner surface. Moreover, adhesive bonding was found to be a good protection against kinking of the outer conductor during bending of the cable. A suitable material is a copolymer of ethylene such as a quaternary polymerisation product thereof. Such a material will firmly adhere to insulation 2 (e.g., polyethylene), but also to the metal of the outer conductor. Alternatively, the outer conductor may be extruded directly as a hollow onto the insulation. In such a situation, bonding is not needed as ihe extrusion process will inherently result an intimate contact with the core. In this case, one may use a low density polyethylene powder. Such a material will also firmly bond to core 12.

In some cases, the cable is to serve as an antenna, i.e., as a radiating cable, so that the outer conductor is provided with slots or other suitable openings. It should be noted that the outer conductor may be of any suitable variety provided it can be made on and supported by the core.

As stated, the die member 16, is constructed as an insert. One will use here wear-resisting material, particularly a material being resistive against abrasion such as steel. The die member 16 may be replaced for example, with one of a larger or smaller diameter if the dimensions of the cable to be made change.

The process was described above with reference to an immediately succeeding sequence of forming insulation 2 and providing layer 8 thereon. This is of advantage, particularly because the powder particles will readily adhere to the still warm extruded plastic. The outer conductor can be formed onto the core right downstream from the die. However, there may be instances in which it is not possible to run a continuous process in that manner. For example, there may not be enough space for one long production line. Therefore, it may be necessary to store the core assembly as it leaves the extruder, on a drum, from which the core is withdrawn and fed to the die when and where it is convenient or necessary to do so.

The invention is not limited to the embodiments described above, but all changes and modifications thereof not constituting departures from the spirit and scope of the invention are intended to be included.

We claim:

1. A method of making a coaxial cable with accurate spacing between inner and outer conductor, comprising the steps of providing an inner conductor:

extruding an insulation layer onto the inner conductor, and at a thickness so that radial dimensions are on the average close to, but not exceeding, radial dimensions of the coaxial cable as regards spacing between the inner conductor and a concentric outer conductor later placed arount it;

moving the inner conductor with extruded insulation in horizontal direction;

pouring an insulative powder on top of the extruded insulation and passing the conductor with the insulation and powder into a funnel-shaped, heated drawing die to melt the powder and distribute a thin sizing film onto the core in order to, thereby, determine the radial dimension thereof; and subsequently forming the outer conductor around the core in intimate contact with the film, the film serving as an adhesive for the outer conductor.

2. A method as in claim 1, including the step of heating the powder prior to the pouring.

3. A method of making a coaxial cable, comprising the steps of providing a first conductor;

extruding a dielectric insulation layer about the first conductor;

providing an insulating and adhesive sizing film onto the layer and using a sizing die for determining the outer dimensions of the film and, thereby the radial dimension of insulation about the conductor as a whole; and providing an outer conductor on top of and around the film.

4. A method as in claim 3, wherein the sizing film is made by melting powder and distributing the powder around the insulation by means of said die.

* * * * *